United States Patent [19]

Luginbuhl et al.

[11] Patent Number: 5,473,728
[45] Date of Patent: Dec. 5, 1995

[54] TRAINING OF HOMOSCEDASTIC HIDDEN MARKOV MODELS FOR AUTOMATIC SPEECH RECOGNITION

[75] Inventors: Tod E. Luginbuhl, Waterford; Michael L. Rosseau, Groton, both of Conn.; Roy L. Streit, Portsmouth, R.I.

[73] Assignee: The United States of America as represented by the Secretary of the Navy, Washington, D.C.

[21] Appl. No.: 22,218

[22] Filed: Feb. 24, 1993

[51] Int. Cl.$^6$ .................................................. G10L 9/00
[52] U.S. Cl. ........................................ 395/25.2; 395/2.65
[58] Field of Search ................................. 395/2.4, 2.45, 395/2.52–2.54, 2.64–2.66; 381/41–43

[56] References Cited

U.S. PATENT DOCUMENTS

| | | | |
|---|---|---|---|
| 4,819,271 | 4/1989 | Bahl et al. | 395/2.65 |
| 4,827,521 | 5/1989 | Bahl et al. | 395/2.65 |
| 5,193,142 | 3/1993 | Zhao | 395/2 |

OTHER PUBLICATIONS

K. K. Paliwal, "A Study of LSF Representation For Speaker—Dependent and Speaker—Independent HMM–Based Speech Recognition Systems", ICASSP '90, 1990, pp. 801–804.

J. S. Bridle et al., "An Alphanet Approach to Optimising Input Transformations For Continuous Speech Recognition", ICASSP '91 1991 pp. 277–280.

*Primary Examiner*—Allen R. MacDonald
*Assistant Examiner*—Michelle Doerrler
*Attorney, Agent, or Firm*—Michael J. McGowan; Prithvi C. Lall; Michael F. Oglo

[57] ABSTRACT

A method for training a speech recognizer in a speech recognition system is described. The method of the present invention comprises the steps of providing a data base containing acoustic speech units, generating a homoscedastic hidden Markov model from the acoustic speech units in the data base, and loading the homoscedastic hidden Markov model into the speech recognizer. The hidden Markov model loaded into the speech recognizer has a single covariance matrix which represents the tied covariance matrix of every Gaussian probability density function PDF for every state of every hidden Markov model structure in the homoscedastic hidden Markov model.

10 Claims, 1 Drawing Sheet

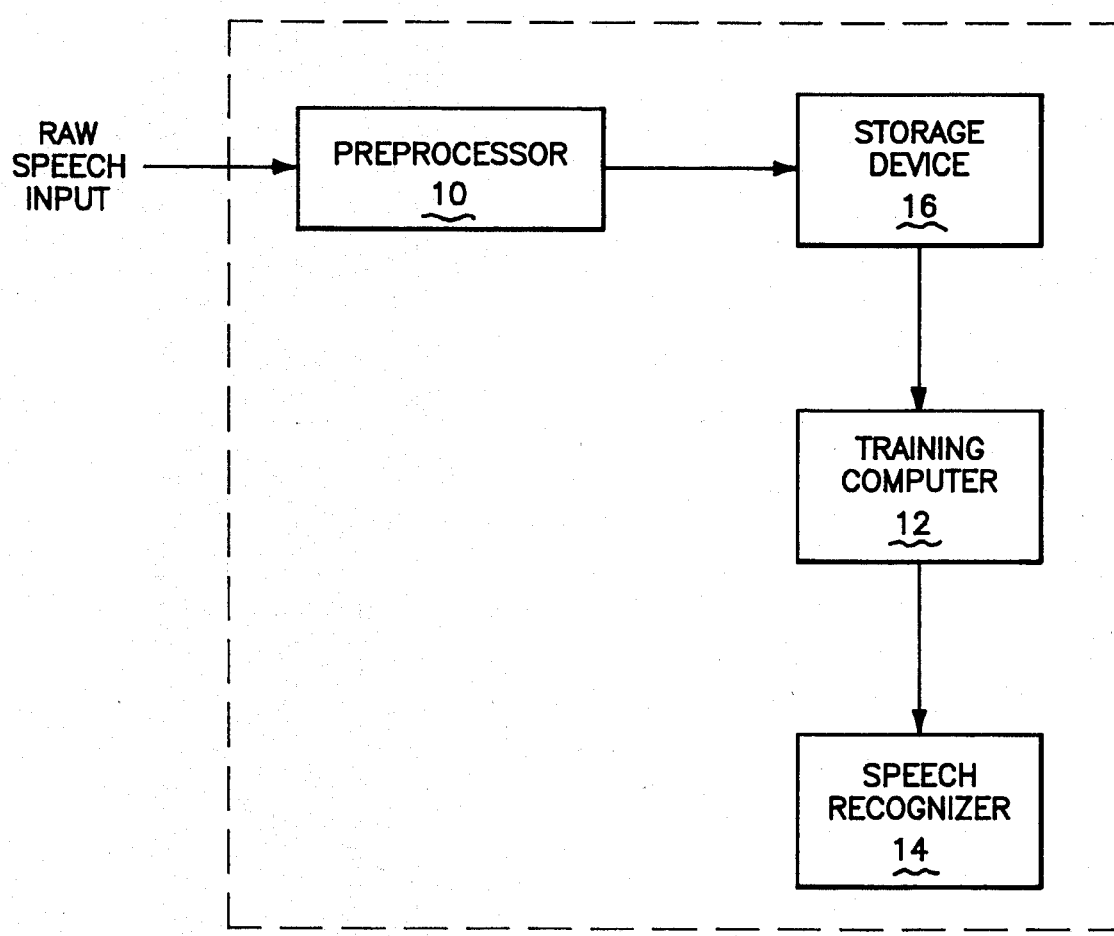

TRAINING OF HOMOSCEDASTIC HIDDEN MARKOV MODELS FOR AUTOMATIC SPEECH RECOGNITION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a speech recognition system using Markov models and in particular to a method for training the speech recognizer in the system.

(2) Description of the Prior Art

The best methods available for automatic machine recognition of speech are based on Hidden Markov Models (HMMs). HMMs are statistical models of the time variation, or temporal structure, of nonstationary time series such as spoken language. Applied to speech, the HMM methods have a training phase, in which the temporal structure of the different acoustic/phonetic speech components (e.g. phonemes, fricatives, etc.) are modeled by HMMs. Approximately 40 such speech units are used in spoken English. There are as many HMMs as there are speech acoustic/phonetic units, so that approximately M=40 HMMs need to be stored for spoken English. In the recognition phase, the speech signal is segmented by a separate process, and then, the previously developed HMMs are used to decide which speech component gave rise to each segment.

One of the state-of-the-art HMM structures for speech recognition is set forth in the article "Maximum-Likelihood Estimation for Mixture Multivariate Stochastic Observations of Markov Chains," by B. J. Juang, *AT&T Technical Journal*, 64(1985), pp. 1235–1240. The HMMs in this model use mixtures of multivariate Gaussian components to model each of the state distributions internal to the HMM structure. Typically, there are about S=10 states in each HMM and approximately G=12 Gaussian components per state. During the training phase, there are $M \times S \times G = 40 \times 10 \times 12 = 4800$ covariance matrices that must be estimated (i.e. trained) and stored for later use in the speech recognition phase. The number of variates in the multivariate Gaussian components is typically on the order of L=10. Since a general covariance matrix of size L requires a minimum of $L(L+1)/2 + 10 \times (10+1)/2 = 55$ floating point numbers, the total storage required by this approach is on the order of $55 \times 4800 = 264,000$ storage locations or one megabyte in a 32-bit computer. The required storage will vary as indicated with the size and number of HMMs and with the precision of the host computer's floating point number representation.

Two important limitations of Juang's fully heteroscedastic HMM structure for modeling the acoustic/phonetic units of speech are storage and training. Large storage requirements, together with the need for fast memory access times in the critical recognition phase, leads to increased hardware cost. Such cost is always an important factor in product marketability. For example, Juang in his computer code restricts himself to diagonal covariance matrices. See U.S. Pat. No. 4,783,804, issued Nov. 8, 1988. This restriction greatly decreases the storage requirements of fully heteroscedastic HMMs; however, Juang does not discuss this important issue.

The training limitation of fully heteroscedastic HMM structures may be even more important than the hardware costs in some product applications. Obtaining reliable statistical estimates of very large HMM parameter sets requires enormous amounts of data. In the example discussed above, 264,000 parameters specify the set of covariance matrices alone, and this does not include the mixing proportions and mean vectors required for each Gaussian component. Clearly, it is very difficult and time consuming to collect and process the extensive training sets required for estimating general heteroscedastic HMMs for each acoustic/phonetic unit. Not only does extensive data collection contribute to the final product cost, it also inhibits the ease of use of the speech recognizer product, especially in speaker adaptive recognition applications.

There are a number of patented speech recognition systems which employ hidden Markov models. One such system is illustrated in U.S. Pat. No. 4,852,180 to Levinson. In this system, Levinson uses a single Gaussian probability density function to model the random observation produced by a state in the Markov chain and a Gamma probability density function to model the length of time or duration the speech unit spends in this state of the Markov chain.

Another speech recognition system employing hidden Markov models is shown in U.S. Pat. No. 5,029,212 to Yoshida. This patent primarily deals with the recognition phase of speech recognition. The invention described therein is directed to a method of computing the likelihood that an observation is a particular speech unit. It uses discrete probability densities and not continuous probability density functions.

U.S. Pat. No. 5,031,217 to Nishimura uses vector quantization methods and discrete probability density functions in the hidden Markov models used to model speech units.

Accordingly, it is an object of the present invention to provide an improved method for training a speech recognizer.

It is a further object of the present invention to provide a method as above which has reduced storage requirements and which requires a reduced amount of training data.

It is yet a further object of the present invention to provide a method as above which has a reduced cost and enhanced consumer appeal and satisfaction.

SUMMARY OF THE INVENTION

The foregoing objects are attained by the method of the present invention. In accordance with the present invention, the method for training a speech recognizer in a speech recognition system comprises the steps of providing a data base containing acoustic speech units, generating a homoscedastic hidden Markov model from the acoustic speech units in the data base, and loading the homoscedastic hidden Markov model into the speech recognizer. A standard preprocessor is used to transform a raw speech input signal into the acoustic speech units stored within the data base. Generating the desired homoscedastic hidden Markov model involves forming a set of training data from the acoustic speech units, converting the training set into hidden Markov models and processing the hidden Markov models to obtain a stable single covariance matrix which represents the tied covariance matrix of every Gaussian PDF for every state of every hidden Markov model structure in the homoscedastic hidden Markov model. After a stable solution has been achieved, the resulting homoscedastic hidden Markov model is loaded into the speech recognizer.

There are two primary advantages to the method of the present invention over the state-of-the-art methods currently used. The first advantage is that the method requires storing only one covariance matrix which is common to all hidden Markov model (HMM) acoustic/phonetic speech models. This significantly reduces the need for fast high speed computer memory, contributes to increased speech recognition speed, and reduces the speech recognizer product cost. The second advantage of the present invention is that it requires significantly less training data for training the speech recognizer than does the state-of-the-art method proposed by Juang. The less training data that must be collected, stored and processed, the easier the speech recognizer is to use and train. Smaller training sets reduce product cost, enhance customer appeal and satisfaction, and increase practicality.

Other details of the method of the present invention and other advantages to the method of the present invention will become more apparent from the following description.

BRIEF DESCRIPTION OF THE DRAWINGS

The FIGURE is a schematic representation of a system for training a speech recognizer.

DESCRIPTION OF THE PREFERRED EMBODIMENTS

As previously discussed, the present invention relates to an improved method for training a speech recognizer. The FIGURE is a schematic representation of a system for training a speech recognizer. The system includes a preprocessor 10, a training computer 12 and a speech recognizer 14.

A preprocessor is a device that transforms a "raw" input speech signal into acoustic speech units, in the form of digital data, which are used to form the HMM structures. The preprocessor samples the speech signal, extracts the features from the time series, and feeds them to a desired storage space typically within the training computer. The preprocessor 10 may comprise any conventional preprocessing device known in the art since the method of the present invention is not dependent upon the structure of the preprocessor. For example, the preprocessor 10 may comprise a first computer adapted to receive an input speech signal and programmed to transform it into digital data. Alternatively, the preprocessor may be an electromechanical device for accomplishing the same result.

The training computer 12 is used to generate a homoscedastic hidden Markov model which is loaded into the speech recognizer 14. The training computer may comprise any suitable computer known in the art programmed to perform the training method of the present invention. The actual program embedded in the computer may be in any desired language and does not form part of the present invention. The method of the present invention relates to the technique by which the desired homoscedastic hidden Markov model is formed.

The training computer 12 may contain a memory storage space for storing the digital data generated by the preprocessor 10. Alternatively, the digital data generated by the preprocessor may be stored in a suitable storage device 16 to which the training computer has access.

The speech recognizer 14 may comprises any suitable speech recognizer known in the art. Typically, it will be a computer programmed or loaded with the homoscedastic hidden Markov model generated by the training computer 12.

While the preprocessor 10, training computer 12, speech recognizer 14, and storage device 16 have been illustrated as being separate devices, they could in fact be separate modules within a single computer.

As previously discussed, the present invention is a marked improvement over Juang's method. Juang's HMM structure treats each speech unit separately. That is, Juang models and trains an HMM for each speech unit. Juang's HMM structure is reinterpreted here as a mixture of speech units so that his approach may be directly compared to the method of the present invention. In the example set out in the Background of the Invention, a speech unit is assumed to be generated at random from a mixture of HMM structures, where each component in the mixture is an HMM structure that represents one of the 40 speech units. Because Juang uses multiple covariance matrices, this mixture of HMM structures is called a heteroscedastic HMM mixture. In addition, Juang restricts himself in his article to fixed length training sequences for each speech unit. In the following presentation of Juang's approach, his technique will be generalized to variable length training sequences.

It is required that a training set T of T labelled, independent and random observations of the M possible speech units be available. T comprises T speech unit samples from the M possible speech units, where the speech unit generating each sample is known (i.e. each sample is correctly labelled). Each speech unit sample T is a measured sequence of time indexed preprocessor outputs and has an associated label representing the speech unit generating the sample.

Let $\chi_n$ represent observation sequence n in the set T; hence, $\chi_n$ is a length $K_n$ sequence of N dimensional real measurements produced by the preprocessor associated with one of the M possible speech units, where $1<K_n<K$ and K is a large integer. Define $$\chi_n = \{X_{kn}\}^{k_n}_{k=1} \tag{1}$$

where $X_{kn}$ denotes a real N dimensional measurement vector output from the preprocessor.

Let $h_m(\cdot|\lambda_m)$ represent the probability density function (PDF) of the heteroscedastic HMM structure for acoustic speech unit m, where $\lambda_m$ is the unknown parameter set defining HMM structure m. Also let $\lambda=\{\alpha_m, \lambda_m\}$ denote the set of unknown parameters in the heteroscedastic HMM mixture. If $\alpha_m$ represents the prior probability of observing acoustic speech unit m, then the likelihood of the observation $\chi_n \epsilon T$ is $$f(\chi_n|\lambda) = \sum_{m=1}^{M} \alpha_m h_m(\chi_n|\lambda_m) \tag{2}$$

It should be noted that $h_m(\cdot\lambda_m)$ is being interpreted as the likelihood of speech unit m generating the observed measurement sequence $\chi_n$. Also, because $\alpha_m$ represents the prior probability for speech unit m, each $\alpha_m > 0$ and $$\sum_{m=1}^{M} \alpha_m = 1. \tag{3}$$

Juang's HMM Model

For each acoustic speech unit m, $h_m(\cdot|\lambda_m)$ contains a Markov chain with the number of states denoted by $S_m \geq 1$. For each acoustic speech unit m, the Markov chain contained $h_m(\cdot|\lambda_m)$ is governed by a $S_m \times S_m$ state transition probability matrix $$A_m = [a_m(i,j)] \tag{4}$$

and an initial state probability vector $$\theta_m = [\theta_m(i)]. \quad (5)$$

The parameter set $\lambda_m$ may be defined as $$\lambda_m = \{A_m, \theta_m, \{\lambda_{lm}\}_{l=1}^{G_{lm}}\} \quad (6)$$

where $\lambda_{lm}$ is a parameter set for the conditional PDF of state l and the number of states $S_m$ is chosen to be as small as possible without compromising speech recognition performance. Conceptually, $\theta_m(i)$ represents the probability of speech unit m starting in state i (for example, high pitch) and $a_m(i,j)$ represents the probability of speech unit m moving from state i to state j (for example, from high pitch to low pitch). By definition, each speech unit m, the state transition probability matrix $A_m$ is row stochastic:

$$\sum_{j=1}^{S_m} a_m(i,j) = 1 \quad (7)$$

for $1 \leq i \leq S_m$. Similarly, because $\theta_m$ represents the initial state probability, $$\sum_{i=1}^{S_m} \theta_m(i) = 1 \quad (8)$$

for $1 \leq m \leq M$. For each state l, there is a corresponding random measurement vector X. The random measurement vector X is assumed to have a heteroscedastic Gaussian mixture PDF represented by the equation:

$$g_{lm}(X|\lambda_{lm}) = \sum_{c=1}^{G_{lm}} \pi_{clm} p_{clm}(X|\mu_{clm}, \Sigma_{clm}), \quad (9)$$

where $\lambda_{lm} = \{\pi_{clm}, \mu_{clm}, \Sigma_{clm}\}_{c=1}^{G_{lm}}$ represents the parameters defining the heteroscedastic Gaussian mixture density for state l, $G_{lm}$ is the number of components in the Gaussian mixture, $\pi_{clm}$ represents the mixture component probability and $p_{clm}(\cdot|\lambda_{clm})$ represents a component PDF. The subscript c is used because it is the first letter in the component. Because $\pi_{clm}$ is a probability, $\pi_{clm} \geq 0$ and $$\sum_{c=1}^{G_{lm}} \pi_{clm} = 1. \quad (10)$$

The component PDF is defined as $$P_{clm}(X|\mu_{clm}, \Sigma_{clm}) = \frac{1}{(2\pi)^{N/2}|\Sigma_{clm}|^{1/2}} \exp\left[-\frac{1}{2}(X-\mu_{clm})^{t-1}\sum_{clm}(X-\mu_{clm})\right] \quad (11)$$

where $\Sigma_{clm}$ represents the covariance matrix of the component Gaussian PDF, $\mu_{clm}$ represents the mean vector of the component Gaussian PDF and $X^t$ denotes the matrix transpose.

Re-interpretation of Juang's HMM structure

In this section, the likelihood function for observation sequence $\chi_n$ in the training set T is developed. For positive integers K, define $\Psi_m(K)$ to be the set of all possible state sequences with lengths equal to K for the Markov chain modelling speech unit m. Since the length of $\chi_n$ is $K_n$, let $\psi_{nm} \in \Psi_m(K_n)$ represent an arbitrary state sequence of length $K_n$ for speech unit m. Specifically, $\psi_{nm}$ consists of an indexed sequence of states $s_{knm}$ of the Markov chain corresponding to the speech unit m, that is $$\psi_{nm} = \{s_{knm}\}_{k=1}^{K_n}. \quad (12)$$

The probability of the state sequence $\psi_{nm} \in \Psi_m(K_n)$ is then $$\theta_m(s_{1nm}) \prod_{k=2}^{K_n} a_m(s_{k-1nm}, s_{knm}). \quad (13)$$

Because the Markov chain for speech unit m is hidden, the state sequence $\psi_{nm}$ is not observed directly; instead only the random observed sequence $\chi_n$ is known. Given the state sequence $\psi_{nm}$, then the likelihood of speech unit m generating the observation $$\chi_n = \{X_{kn}\} \text{ is } \prod_{k=1}^{K_n} g_{lm}(X_{kn}|\lambda_{lm})|_{l=s_{knm}}. \quad (14)$$

Hence, the joint PDF of the state sequence $\psi_{nm}$ and the speech unit m generating the observed measurement sequence $\chi_n$ is the product of these factors:

$$\theta_m(s_{1nm})g_{lm}(X_{1n}|\lambda_{lm})|_{l=s_{1nm}} \prod_{k=2}^{K_n} a_m(s_{k-1nm}, s_{knm})g_{lm}(X_{kn}|\lambda_{lm})|_{l=s_{knm}}. \quad (15)$$

To obtain $h_m(\chi_n|\lambda_m)$ (the PDF, of speech unit m generating the observation sequence $\chi_n$), the last equation must be summed over all possible state sequences of the Markov chain; hence, $$h_m(\chi_n|\lambda_m) = \sum_{\psi_m(K_n)} \theta_m(s_{1nm})g_{lm}(X_{1n}|\lambda_{lm})|_{l=s_{1nm}} \prod_{k=2}^{K_n} a_m(s_{k-1nm}, s_{knm})g_{lm}(X_{kn}|\lambda_{lm})|_{l=s_{knm}} \quad (16)$$

where the sum is over all the possible state sequences of length $K_n$ for speech unit m. Finally, the total likelihood of observing the measurement sequence $X_n$ in the heteroscedastic HMM mixture is $$f(\chi_n|\lambda) = \sum_{m=1}^{M} \alpha_m h_m(\chi_n|\lambda_m) = \quad (17)$$

$$\sum_{m=1}^{M} \sum_{\psi_m(K_n)} \theta_m(s_{1nm}) G_{lm}(X_{1n}|\lambda_{lm})|_{l=s_{1nm}} \times$$

$$\alpha_m \theta_m(s_{1nm}) \prod_{k=2}^{K_n} a_m(s_{k-1nm}, s_{knm}) g_{lm}(X_{kn}|\lambda_{lm})|_{l=s_{kn}}.$$

Therefore, the likelihood of the entire set of observations T from the M speech units is $$L(T|\lambda) = \prod_{n=1}^{T} f(\chi_n|\lambda) \quad (18)$$

because the observation $X_n$ are independent.

Simplification Caused By the Present Invention

The method for training a speech recognizer in accordance with the present invention is simpler than other methods using heteroscedastic HMM mixture. It is simpler because the method utilizes a homoscedastic HMM mixture in which the same covariance matrix $\Sigma$ is used in all components of the Gaussian mixture PDFs for each HMM state for all HMM's of the M speech units. The covariance matrix $\Sigma$ can be said to be "tied" across the HMM mixture. The use of a mixture of homoscedastic HMM structures with a tied covariance matrix greatly simplifies Juang's heteroscedastic HMM mixture for each of the acoustic/phonetic speech units. A major difference between the approach of the present invention, and Juang's approach can be found in the definition of Markov chain state mixture Gaussian PDF's for each HMM structure. During the discussion of Juang's heteroscedastic HMM mixture, the heteroscedastic Gaussian mixture PDF associated with state l of HMM m was given as:

$$g_{lm}(X_{kn}|\lambda_{lm}) = \sum_{c=1}^{G_{lm}} \pi_{clm} P_{clm}(X_{kn}|\mu_{clm}, \Sigma_{clm}), \quad (19)$$

where $\lambda_{lm} = \{\pi_{clm}, \mu_{clm}, \Sigma_{clm}\}$ represented the parameters defining the heteroscedastic Gaussian mixture density, $G_{lm}$ where the number of components, $\pi_{clm}$ represented a mixture component probability and $P_{clm}(\cdot|\mu_{clm}, \Sigma_{clm})$ represented a component Gaussian PDF. The component Gaussian PDF was defined as $$P_{clm}(X|\mu_{clm}, \Sigma_{clm}) = \quad (20)$$

$$\frac{1}{(2\pi)^{N/2}|\Sigma_{clm}|^{1/2}} \exp\left[-\frac{1}{2}(X-\mu_{clm})'\Sigma_{clm}^{-1}(X-\mu_{clm})\right]$$

where $\Sigma_{clm}$ represented the covariance of the component Gaussian PDF, $\mu_{clm}$ represented the mean vector of the component Gaussian PDF and $X'$ denoted the matrix transpose.

For a homoscedastic HMM structure such as that used in the present invention the heteroscedastic Gaussian mixture PDF associated with each state of Juang's HMM structure is changed to a homoscedastic Gaussian mixture PDF which is defined as $$g_{lm}(X_{kn}|\lambda_{lm}) = \sum_{c=1}^{G_{lm}} \pi_{clm} P_{clm}(X_{kn}|\mu_{clm}, \Sigma) \quad (21)$$

where $\lambda_{lm} = \{\pi_{clm}, \mu_{clm}, \Sigma\}$ represents the parameters defining the homoscedastic Gaussian mixture density, $G_{lm}$ is the number of components, $\pi_{clm}$ represents a mixture component probability and $p_{clm}(\cdot|\mu_{clm}, \Sigma)$ represents a component Gaussian PDF. The component Gaussian PDF for the homoscedastic case is defined as:

$$P_{clm}(X|\mu_{clm}, \Sigma) = \quad (22)$$

$$\frac{1}{(2\pi)^{N/2}|\Sigma|^{1/2}} \exp\left[-\frac{1}{2}(X-\mu_{clm})'\Sigma^{-1}(X-\mu_{clm})\right]$$

where $\Sigma$ represents the tied covariance matrix of every Gaussian PDF for every state of every HMM structure in the homoscedastic HMM mixture and $\mu_{clm}$ represented the mean vector of the component Gaussian PDF. Note that there are no subscripts on the covariance matrix $\Sigma$. The difference between the homoscedastic HMM mixture and Juang's heteroscedastic HMM mixture is that only one covariance matrix is used with the homoscedastic HMM mixture and Juang's requires many covariance matrices. In the example in the Background section, Juang's method required 4800 covariance matrices whereas the method of the present invention only requires one.

Homoscedastic HMM mixtures, as proposed herein, can achieve the same performance as the heteroscedastic HMM mixtures proposed by Juang. The proof of this important mathematical fact is essentially a corollary of a therorem due to E. Parzen, "On Estimation of a Probability Density Function," *Annals of Mathematical Statistics*, 33(1962), 1065–1076. Parzen's theorem shows that a common "kernal" can he used to estimate several probability density functions (PDF's) simultaneously. In the language of this invention, Parzen's theorem shows that the same covariance matrix can be used across all HMM's to approximate the necessary PDF's of the HMM mixtures. Parzen, however, did not interpret his theorem in this very important way, nor could he have conceptualized its use within an HMM structure because HMM's were not defined until after his theorem was published.

The complexity of heteroscedastic HMM mixture speech recognizers is strongly affected by the number of Gaussian components because each component is different. They also require good estimates of the underlying HMM covariance matrices to attain their optimum performance, and the estimation of so many different parameters in heteroscedastic HMM mixtures requires extremely large training set sizes for each acoustic/phonetic speech unit. Such training sets are very difficult to manipulate in many commercial applications. The recognition performance of heteroscedastic HMM's is also limited by the fact that the speech signal is not truly generated by a sequence of HMM's. Thus, all that can be achieved in practice is to reduce the modeling error to sufficiently small levels by increasing HMM size, and this in turn places a greater burden on accurately training the larger heteroscedastic HMM's.

The training method of the present invention using a homoscedastic HMM mixture is simpler than those employing a heteroscedastic HMM mixture. In the present invention, because the number of parameters defining homoscedastic HMM mixtures is much less than that of heteroscedastic HMM mixtures, the size of the training set used to generate the desired HMM can be reduced without adversely affecting parameter estimation accuracy. Moreover, the training algorithm convergence rate is also improved. The simplification and improvements follow directly from pooling the HMM training sets from all acoustic/phonetic units so that the labels of the acoustic/phonetic units are retained and constraining the problem to that of estimating only the one covariance matrix $\Sigma$.

In accordance with the present invention, a homoscedastic hidden Markov model to be loaded into the speech recognizer is generated by first forming a set of training data. The set of training data T consists of independent and random observation from all of the M possible acoustic/phonetic speech units and contains a total of T observations. The training data is collected so that each observation in T retains its true speech unit label; hence, T is partitioned into M subsets by the M acoustic/phonetic speech units:

$$T=\{T_1 \cup \ldots \cup T_m\}. \quad (23)$$

The training set $T_m$ contains $T_m$ observations from speech unit m, where $T_m=(\chi_{pm})$. Thus $T=T_1+\ldots+T_m$. Because the training set T is labelled by class, the overall likelihood function for T described in equation (18) simplifies to $$L(T|\lambda) = \prod_{m=1}^{M} \prod_{p=1}^{T_m} \alpha_m h_m(\chi_{pm}|\lambda_m). \quad (24)$$

The observation sequence $\chi_{pm} \in T_m$ from speech unit m contains $K_{pm}$ measurement vectors $X_{kpm}$. For training iteration n, let $F_{kpm}(i)$, $B_{kpm}(i)$ and $C_{kpm}(i,c)$ denote the forward, backward and component state likelihoods, respectively, where the subscript triple (k,p,m)=(measurement vector k, training sequence p, speech unit m).

The arguments i and c represent a Markov chain state and a mixture Gaussian PDF component respectively.

For each training iteration, the forward, backward and component likelihoods are computed recursively as follows $$F^{(n)}_{kpm}(i) = \quad (25)$$

$$\begin{cases} \theta_m^{(n-1)}(i), & k = 0 \\ \sum_{j=1}^{S_m} F^{(n)}_{k-1pm}(j) a_m^{(n-1)}(j,i) g_{im}(X_{kpm}|\lambda_{im}^{(n-1)}), & k = 1, \ldots, K_{pm}, \end{cases}$$

$$B^{(n)}_{kpm}(i) = \quad (26)$$

$$\begin{cases} 1, & k = K_{pm} \\ \sum_{j=1}^{S_m} B^{(n)}_{k+1pm}(j) a_m^{(n-1)}(j,i) g_{im}(X_{kpm}|\lambda_{im}^{(n-1)}), & k = K_{pm}-1, \ldots, 0 \end{cases}$$

for i=1, . . . ,$S_m$ and $$C^{(n)}_{kpm}(j,c) = \sum_{i=1}^{S_m} F^{(n)}_{(k-1)pm}(i) a_m^{(n-1)}(i,j) P_{cjm}(X_{kpm}|\lambda_{cjm}^{(n-1)}) \quad (27)$$

for k=1, . . . ,$K_{pm}$, c=1, . . . ,$G_{jm}$=1, . . . ,$S_m$ where $$g_{lm}(X_{kpm}|\lambda_{lm}) = \sum_{c=1}^{G_{lm}} \pi_{clm} P_{clm}(X_{kpm}|\mu_{clm},\Sigma) \quad (28)$$

and $$P_{clm}(X_{kpm}|\mu_{clm}^{(n-1)},\Sigma^{(n-1)}) = \quad (29)$$

$$\frac{1}{(2\pi)^{N/2}|\Sigma^{(n-1)}|^{1/2}} \exp\left[-\frac{1}{2}(X_{kpm} - \mu_{clm}^{(n-1)})^t(\Sigma^{(n-1)})^{-1}(X_{kpm} - \mu_{clm}^{(n-1)})\right].$$

Note that i,j and l are all used to denote Markov chain states in the above equations. Once these likelihoods are computed, the parameter estimates are updated using these likelihoods in the following equations:

Initial state probability:

$$\theta_m^{(n)}(i) = \frac{\sum_{p=1}^{T_m} F_{opm}^{(n)}(i) B_{opm}^{(n)}(i)}{\sum_{p=1}^{T_m} \sum_{i=1}^{S_m} F_{opm}^{(n)}(i) B_{opm}^{(n)}(i)} \quad (30)$$

State transition probability:

$$a_m^{(n)}(i,j) = a_m^{(n-1)}(i,j) \frac{\sum_{p=1}^{T_m} \sum_{k=1}^{K_{pm}} F_{k-1pm}^{(n)}(i) g_{jm}(X_{kpm}|\lambda_{jm}^{(n-1)}) B_{kpm}^{(n)}(j)}{\sum_{p=1}^{T_m} \sum_{k=1}^{K_{pm}} F_{k-1pm}^{(n)}(i) B_{k-1pm}^{(n)}(i)} \quad (31)$$

Within class mixing proportions:

$$\pi_{cim}^{(n)} = \frac{\sum_{p=1}^{T_m} \sum_{k=1}^{K_{pm}} C_{kpm}^{(n)}(i,c) B_{kpm}^{(n)}(i)}{\sum_{p=1}^{T_m} \sum_{k=1}^{K_{pm}} F_{kpm}^{(n)}(i) B_{kpm}^{(n)}(i)} \quad (32)$$

Component means:

$$\mu_{cim}^{(n)} = \frac{\sum_{p=1}^{T_m} \sum_{k=1}^{K_{pm}} X_{kpm} C_{kpm}^{(n)}(i,c) B_{kpm}^{(n)}(i)}{\sum_{p=1}^{T_m} \sum_{k=1}^{K_{pm}} C_{kpm}^{(n)}(i,c) B_{kpm}^{(n)}(i)} \quad (33)$$

Covariance matrix:

$$\Sigma^{(n)} = \frac{\sum_{m=1}^{M} \sum_{p=1}^{T_m} \sum_{k=1}^{K_{pm}} \sum_{i=1}^{S_m} \sum_{c=1}^{G_{im}} (X_{kpm} - \mu_{cim}^{(n)})(X_{kpm} - \mu_{cim}^{(n)})^t C_{kpm}^{(n)}(i,c) B_{kpm}(i)}{\sum_{m=1}^{M} \sum_{p=1}^{T_m} \sum_{k=1}^{K_{pm}} \sum_{i=1}^{S_m} F_{kpm}^{(n)}(i) B_{kpm}^{(n)}(i)} \quad (34)$$

The update equation for the tied covariance matrix Σ of the homoscedastic mixture is summed over the entire training set T. That is, all of the data in the training set τ from each of the M acoustic/phonetic speech units is used to estimate Σ. Specifically, there are five summations in the recursion for Σ. The first summation is over the HMM structures representing the M speech units; the second summation is over the $T_m$ training sequences {$\chi_{pm}$} from speech unit m; the third summation is over the $K_{pm}$ measurement vectors {$\chi_{kpm}$} of the training sequence $\chi_{pm}$; the fourth summation is over the $S_m$ states for HMM structure m; and finally, the fifth summation is over the $G_{im}$ Gaussian components in the mixture PDF associated with state i of HMM structure m.

The training iterations are continued until a stable solution for the covariance matrix is found. That is, training iterations are continued until the parameters in the homoscedastic HMM structure do not change significantly. After the stable solution has been found, the homoscedastic hidden Markov model is loaded into the speech recognizer. For example, the model may be in the form of a program loaded into a computer forming the speech recognizer.

The training method for heteroscedastic HMM mixtures is significantly more complex. Specifically, for the heteroscedastic HMM mixture, it is necessary to reestimate that covariance matrices for each component of each state of each acoustic/phonetic speech unit every iteration. The heteroscedastic model changes the last equation of the iteration algorithm for the homoscedastic HMM mixture to $$\Sigma^{(n)}_{cim} = \frac{\sum_{p=1}^{T_m} \sum_{k=1}^{K_{pm}} (X_{kpm} - \mu^{(n)}_{cim})(X_{kpm} - \mu^{(n)}_{cim})^t C^{(n)}_{kpm}(i,c) B_{kpm}(i)}{\sum_{p=1}^{T_m} \sum_{k=1}^{K_{pm}} F^{(n)}_{kpm}(i) B^{(n)}_{kpm}(i)} \quad (35)$$

While this formula looks simpler because it has fewer summations than the formula for updating the tied covariance matrix in the homoscedastic HMM mixture, this last equation must be executed once every update for each covariance matrix for each state for each HMM in the heteroscedastic HMM mixture. In the example in the Background, this equation is executed 4800 times every iteration of the training algorithm (once for each covariance matrix). Therefore, updating all the covariance matrices in the heteroscedastic HMM mixture is significantly more complex than updating the covariance matrix in the homoscedastic HMM mixture.

As previously mentioned, there are two primary advantages to the method of this invention over the state-of-the-art method proposed originally by Juang. First, the invention presented herein requires storing only one covariance matrix which is common to all HMM acoustic/phonetic speech models. This significantly reduces the need for fast high speed computer memory, contributes to increased speech recognition speed, and reduces the speech recognizer product cost.

The second advantage of the present invention presented is that it requires significantly less training data for training the speech recognizer than does the state-of-the-art method proposed by Juang. Pooling the speech unit training sets $T_m$ also reduces potential difficulties associated with building HMM's for uncommon acoustic/phonetic speech units (i.e. for speech units represented by few samples in the training set). These aspects are more important for speaker dependent recognizers than for speaker independent recognizers. The less training data that must be collected, stored and processed, the easier the speech recognizer is to use and train. For example, decreased training set size is especially important in speaker adaptive applications. Smaller training sets reduce product cost, enhance customer appeal and satisfaction, and increase practicality.

It is apparent that there has been provided in accordance with this invention a method for training a speech recognizer using a hidden Markov model which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for training a speech recognizer in a speech recognition system, said method comprising the steps of:

providing a data base containing a plurality of acoustic speech units;

generating a homoscedastic hidden Markov model (HMM) from said plurality of acoustic speech units in said data base;

said generating step comprises forming a set of pooled training data from said plurality of acoustic speech units and estimating a single global covariance matrix using said pooled training data set, said single global covariance matrix representing a tied covariance matrix for every Gaussian probability density function (PDF) for every state of every hidden Markov model structure in said homoscedastic hidden Markov model; and loading said homoscedastic hidden Markov model into the speech recognizer.

2. The method of claim 1 wherein the training data set forming step comprises:

forming the training data set from all possible ones of said plurality of speech units in said data base, said training data set containing a number of observations for each of said speech units; and collecting the training data for said set so that each said observation retains a true speech unit label.

3. The method of claim 2 further comprising:

forming a HMM for each speech unit.

4. The method of claim 3 further comprising:

conducting a plurality of training iterations wherein a forward state likelihood for a Markov chain state, a backward state likelihood for said Markov chain state and a component state likelihood for said Markov chain state and a mixture Gaussian PDF component are computed recursively for a given measurement vector, training sequence and speech unit.

5. The method of claim 4 wherein said estimating step comprises:

estimating said single covariance matrix from said likelihoods; and storing said estimated single covariance matrix in a computer used to perform said training iterations.

6. The method of claim 5 wherein said conducting step includes:

updating parameter estimates including said estimated single covariance matrix using said likelihoods in the following equations:

a. Initial state probability:

$$\theta^{(n)}_m(i) = \frac{\sum_{p=1}^{T_m} F^{(n)}_{opm}(i) B^{(n)}_{opm}(i)}{\sum_{p=1}^{T_m} \sum_{i=1}^{S_m} F^{(n)}_{opm}(i) B^{(n)}_{opm}(i)}$$

b. State transition probability:

$$a^{(n)}_m(i,j) = a^{(n-1)}_m(i,j) \frac{\sum_{p=1}^{T_m} \sum_{k=1}^{K_{pm}} F^{(n)}_{k-1pm}(i) g_{jm}(X_{kpm}|\lambda^{(n-1)}_{jm}) B^{(n)}_{kpm}(j)}{\sum_{p=1}^{T_m} \sum_{k=1}^{K_{pm}} F^{(n)}_{k-1pm}(i) B^{(n)}_{k-1pm}(i)}$$

c. Within class mixing proportions:

$$\pi_{cim}^{(n)} = \frac{\sum_{p=1}^{T_m} \sum_{k=1}^{K_{pm}} C_{kpm}^{(n)}(i,c) B_{kpm}^{(n)}(i)}{\sum_{p=1}^{T_m} \sum_{k=1}^{K_{pm}} F_{kpm}^{(n)}(i) B_{kpm}^{(n)}(i)}$$

d. Component means:

$$\mu_{cim}^{(n)} = \frac{\sum_{p=1}^{T_m} \sum_{k=1}^{K_{pm}} X_{kpm} C_{kpm}^{(n)}(i,c) B_{kpm}^{(n)}(i)}{\sum_{p=1}^{T_m} \sum_{k=1}^{K_{pm}} C_{kpm}^{(n)}(i,c) B_{kpm}^{(n)}(i)}$$

e. Covariance matrix:

$$\Sigma^{(n)} = \frac{\sum_{m=1}^{M} \sum_{p=1}^{T_m} \sum_{k=1}^{K_{pm}} \sum_{i=1}^{S_m} \sum_{c=1}^{G_{im}} (X_{kpm} - \mu_{cim}^{(n)})(X_{kpm} - \mu_{cim}^{(n)})^t C_{kpm}^{(n)}(i,c) B_{kpm}^{(n)}(i)}{\sum_{m=1}^{M} \sum_{p=1}^{T_m} \sum_{k=1}^{K_{pm}} \sum_{i=1}^{S_m} F_{kpm}^{(n)}(i) B_{kpm}^{(n)}(i)}$$

where
$\theta_m(i)$=probability of speech unit m starting in state (i),
$F_{opm}$=initial forward component state likelihood,
$B_{opm}$=initial backward component state likelihood,
$a_m(i,j)$=probability of speech unit m moving from state i to state j,
$F_{kpm}$=forward component state likelihood,
$g_{jm}$=Gaussian mixture PDF,
$X_{kpm}$=a measurement vector,
$\lambda_{jm}$=a parameter set data for HMM structure m,
$B_{kpm}(i)$=backward component state likelihood,
$\pi_{cim}$=mixture component probability,
$C_{kpm}(i,c)$=component state likelihood,
$\mu_{cim}$=mean vector of the component Gaussian PDF,
$\Sigma$=covariance matrix,
$K_{pm}$=measurement vector,
$G_{im}$=Gaussian component in mixture PDF associated with state i of HMM structure m,
T=entire set of training data,
$T_m$=training set for speech unit m,
$S_m$=states for HMM structure, M=number of acoustic/phonetic speech units m,
k=measurement vector,
p=training sequence,
i=Markov state,
c=mixture Gaussian PDF component, and determining an updated estimated single covariance matrix.

7. The method of claim 6 further comprising:

continuing said training iterations until a stable solution for said covariance matrix is found; and said updating step including updating and storing said covariance matrix after each training iteration.

8. The method of claim 1 wherein said data base providing step comprises:

providing a speech preprocessor;

transforming a raw input speech signal inputted into said speech preprocessor into said plurality of acoustic speech units; and storing said plurality of acoustic speech units in a storage device.

9. The method of claim 8 wherein said homoscedastic hidden Markov model generating step further comprises:

transferring information concerning said plurality of acoustic speech units stored in said storage device to a training computer programmed to form said homoscedastic hidden Markov model; and mathematically converting said information into a series of hidden Markov structures from which said homoscedastic hidden Markov model having a single covariance matrix is formed.

10. The method of claim 9 wherein said loading step comprises:

storing said homoscedastic hidden Markov model with said single covariance matrix in a computer forming said speech recognizer.

* * * * *